United States Patent [19]

Cavil et al.

Best Available Copy

[11] 4,260,937
[45] Apr. 7, 1981

[54] SPEED SENSITIVE FIELD WEAKENING CONTROL FOR TRACTION MOTORS

[75] Inventors: David T. Cavil, Menomonee Falls; William R. Krueger, Hartford, both of Wis.

[73] Assignee: Outboard Marine Corporation, Waukegan, Ill.

[21] Appl. No.: 796,856

[22] Filed: May 16, 1977

[51] Int. Cl.³ ............................................. H02P 5/06
[52] U.S. Cl. ................................. 318/358; 318/359; 318/465; 318/428; 318/533; 318/251
[58] Field of Search ............... 318/314, 315, 350, 357, 318/358, 465, 428, 138, 254, 359, 251, 533; 307/233 A, 232, 233

[56] References Cited

U.S. PATENT DOCUMENTS

| | | | |
|---|---|---|---|
| 3,274,469 | 9/1966 | Tsuboi et al. | 318/465 |
| 3,360,705 | 12/1967 | Morris | 318/251 |
| 3,382,423 | 5/1968 | Clark | 318/318 |
| 3,384,799 | 5/1968 | Thiele | 318/358 |
| 3,590,352 | 6/1971 | Ries et al. | 318/350 |
| 3,820,024 | 6/1974 | Wise et al. | 324/173 |
| 3,999,108 | 12/1976 | Tanikoshi | 318/138 |
| 4,021,681 | 5/1977 | Miesterfeld | 307/233 A |
| 4,035,704 | 7/1977 | York | 318/358 |

Primary Examiner—J. V. Truhe
Assistant Examiner—Eugene S. Indyk

[57] ABSTRACT

Disclosed herein is a control for a direct current motor including a field weakening solenoid switch including a solenoid coil, which control includes an electronic switch connected in series with the coil for selectively connecting the coil to a source of direct current, and a device adapted for providing an electronic digital signal having a frequency proportional to motor speed. The control also includes a first electronic comparator adapted for receiving the digital signal and for providing an output cut-in signal for operating the electronic switch so as to connect the solenoid coil to the source of direct current to effect field weakening when the motor speed increases to a predetermined field weakening cut-in speed, and a second electronic comparator adapted for receiving the digital signal and for providing an output cut-out signal for operating the electronic switch to disconnect the coil from the source of direct current so as to prevent field weakening when the motor speed increases to a predetermined field weakening cut-out speed greater than the predetermined field weakening cut-in speed.

14 Claims, 2 Drawing Figures

SPEED SENSITIVE FIELD WEAKENING CONTROL FOR TRACTION MOTORS

BACKGROUND OF THE INVENTION

The invention relates generally to control of direct current traction motors.

The invention also relates, more particularly, to control of direct current traction motors having a field weakening resistor and, still more particularly, to control arrangements for connecting and disconnecting the field weakening resistor in parallel with the field winding of such motors. Still more particularly, the invention is directed to a further development of the invention disclosed in U.S. Cavil et al. U.S. Pat. No. 4,131,832 issued Dec. 26, 1978, which is assigned to the same assignee as this application.

SUMMARY OF THE INVENTION

The invention provides a control for a direct current motor including a field weakening solenoid switch including a solenoid coil. The control includes electronic switching means connected in series with the coil for selectively connecting the coil to a source of direct current, speed sensor means for providing an electronic digital signal having a frequency proportional to motor speed, and circuit means for receiving the digital signal and for generating an output signal for operating the electronic switching means.

In accordance with an embodiment of the invention, the speed sensor means comprises a Hall-effect switch adapted for generating the digital signal in response to one or more magnets passing adjacent the Hall-effect switch, the magnets being secured to a rotating member having a speed of rotation proportional to motor speed.

Also in accordance with an embodiment of the invention, the circuit means includes digital to analog conversion means coupled to the speed sensor means for receiving the digital signal and for generating a DC signal having a voltage magnitude proportional to the frequency of the digital signal and to motor speed. The digital to analog conversion means can comprise a phase-locked-loop having an input coupled to the speed sensor means for receiving the digital signal, and being adapted for generating the DC signal.

Also in accordance with an embodiment of the invention, the circuit means includes comparator means adapted for receiving the DC signal and for generating an output cut-in signal coupled to the electronic switching means for operating the electronic switching means to connect the solenoid coil to the source of direct current to weaken the field when the motor speed increases to a predetermined field weakening cut-in speed. The circuit means preferably includes second comparator means adapted for receiving the DC signal and for generating an output cut-out signal coupled to the electronic switching means for operating the electronic switching means to disconnect the solenoid coil from the source of direct current to prevent field weakening when the motor speed increases to a predetermined field weakening cut-out speed which is greater than the predetermined field weakening cut-in speed.

Also in accordance with an embodiment of the invention, the first comparator means includes a first operational amplifier having a normal input and an inverting input with one of the inputs being coupled to the DC signal, bias means coupled to the other one of the inputs and adjusted so that the operational amplifier switches to provide an enabling output when the DC signal rises to a magnitude corresponding to the motor speed increasing to the predetermined field weakening cut-in speed, and buffer means adapted for receiving the enabling output and for generating the output cut-in signal which is coupled to the electronic switching means.

Also in accordance with an embodiment of the invention, the second comparator means includes a second operational amplifier having a normal input and an inverting input with one of the inputs being coupled to the DC signal, second biasing means coupled to the other one of the inputs so that the second operational amplifier switches to provide an enabling output when the DC signal rises to a magnitude corresponding to the motor speed increasing to the predetermined field weakening cut-out speed, and second buffer means adapted for receiving the enabling output and for generating the output cut-out signal which is coupled to the electronic switching means.

Also in accordance with an embodiment of the invention, the electronic switching means comprises a first transistor having a collector-emitter path connected in series with the solenoid coil and with the source of direct current. The first transistor includes a base which is coupled to the first buffer means to receive the output cut-in signal which turns on the first transistor, and hence, the solenoid coil is energized to effect field weakening when the motor speed increases to the predetermined field weakening cut-in speed. The electronic switching means also preferably includes a second transistor having a collector-emitter path coupled to the base of the first transistor. The second transistor also includes a base coupled to the second buffer means to receive the output cut-out signal which turns on the second transistor, and hence, turns off the first transistor to disconnect the solenoid coil from the source of direct current to prevent field weakening when the motor speed increases to the predetermined field weakening cut-out speed.

One of the principal features of the invention is the provision of a control for a direct current traction motor which includes speed sensor means for providing an electronic digital signal having a frequency proportional to motor speed, and circuit means adapted for receiving said digital signal and for generating an output cut-in signal for operating electronic switching means for selectively connecting the coil of a field weakening solenoid switch to a source of direct current to effect field weakening of the motor when the motor speed increases to a predetermined field weakening cut-in speed.

Another of the principal features of the invention is the provision of such a control wherein the circuit means is adapted for generating an output cut-out signal for operating the electronic switching means to prevent field weakening of the direct current motor when the motor speed increases to a predetermined field weakening cut-out speed greater than the predetermined field weakening cut-in speed.

Various additional features and advantages of the embodiments of the invention will become known by reference to the following general description, appended claims, and drawings.

THE DRAWINGS

Before explaining the embodiments of the invention in detail, it is to be understood that the invention is not limited in its application to the details of construction and arrangement of parts set forth in the following general description or illustrated in the accompanying drawings, since the invention is capable of other embodiments and of being practiced and carried out in various ways. Also it is to be understood that the phraseology or terminology employed herein is for the purpose of description and should not be regarded as limiting.

GENERAL DESCRIPTION

Figure 1:
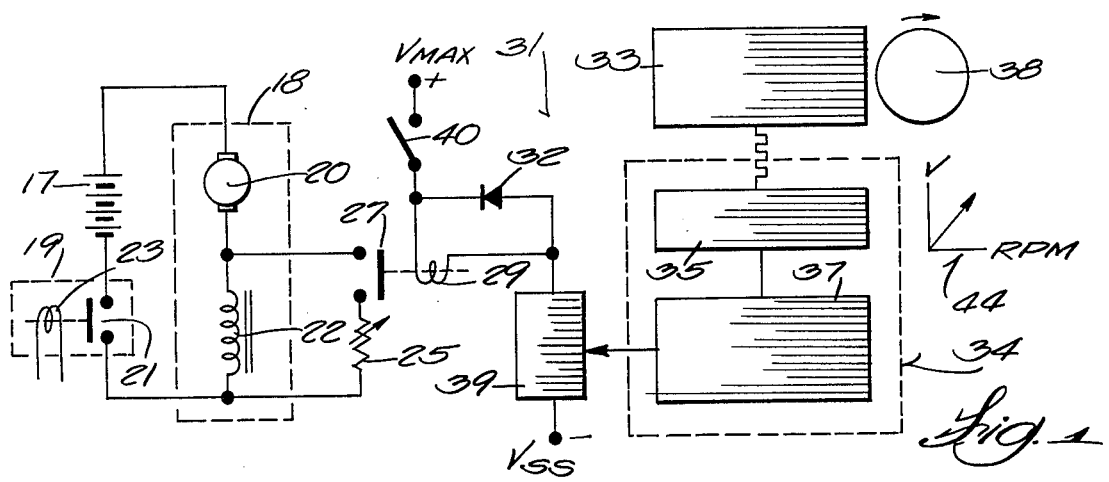
FIG. 1 is a partially schematic and partially diagrammatic view of a motor controlling arrangement embodying various of the features of the invention.

Shown schematically in FIG. 1 is a direct current traction motor 18 including an armature 20 which is connected in series with a field winding 22 and with any suitable source of direct current, such as a series of batteries 17, together with a speed and direction controller 19 including a main control solenoid switch 21 which is spring or otherwise biased to the open position, and which is closable to energize the motor 18 in response to energizing of a solenoid actuating coil 23 or in response to manual manipulation.

Also included in the motor 18 is a field weakening shunt resistor 25 which is connected in parallel with the field winding 22, subject to the action of a solenoid actuated switch 27, which is spring or otherwise biased to the open position, and which is closable to electrically connect the field weakening resistor 25 in parallel with the field winding 22 in response to energizing of a solenoid coil 29 which is coupled to a control circuit 31 (shown diagrammatically in FIG. 1). Diode 32 acts as a free wheeling diode for the solenoid inductance.

The control circuit 31 is responsive to motor speed and can regulate connecting the field weakening resistor 25 in parallel with the field winding 22 by selectively energizing the solenoid coil 29. More particularly, the solenoid coil 29 is connected, at one end, through a suitable manually operated on-off switch or foot control 40, to one terminal of a source of direct current, designated Vmax, such as a battery (not shown) and, at the other end, to electronic switching means 39, in turn connected to the other terminal of the source of direct current, designated Vss. As will be described in more detail below, the switching means 39 selectively energizes the solenoid coil 29 (assuming switch 40 is closed) by selectively connecting the coil 29 in series between the terminals Vmax and Vss of the source of direct current.

As shown diagrammatically in FIG. 1, the control circuit 31 includes a motor speed sensor 33, activated by sensing the speed of a rotating member 38 having a speed proportional to vehicle or motor speed, and which provides an electronic digital signal having a frequency proportional to the motor speed. The digital signal is fed into circuit means, generally designated 34, and which preferably includes digital to analog conversion means 35 and comparator means 37. The digital to analog conversion means provides a DC ramp output signal, designated 44, (diagrammatically shown) having a voltage magnitude proportional to the frequency of the digital signal, and hence, to the motor speed.

The DC signal is fed into the comparator means 37 which provides an output for operating the electronic switching means 39 to energize or de-energize solenoid coil 29. The digital to analog conversion means 35 and the comparator means 37 are calibrated or adjusted to operate the switching means 39 so that, when the motor is operating within a predetermined speed range, i.e., at a speed where field weakening is desired, the solenoid coil 29 is energized, resulting in the field weakening resistor 25 being connected in parallel with the field winding 22 to effect field weakening.

Figure 2:
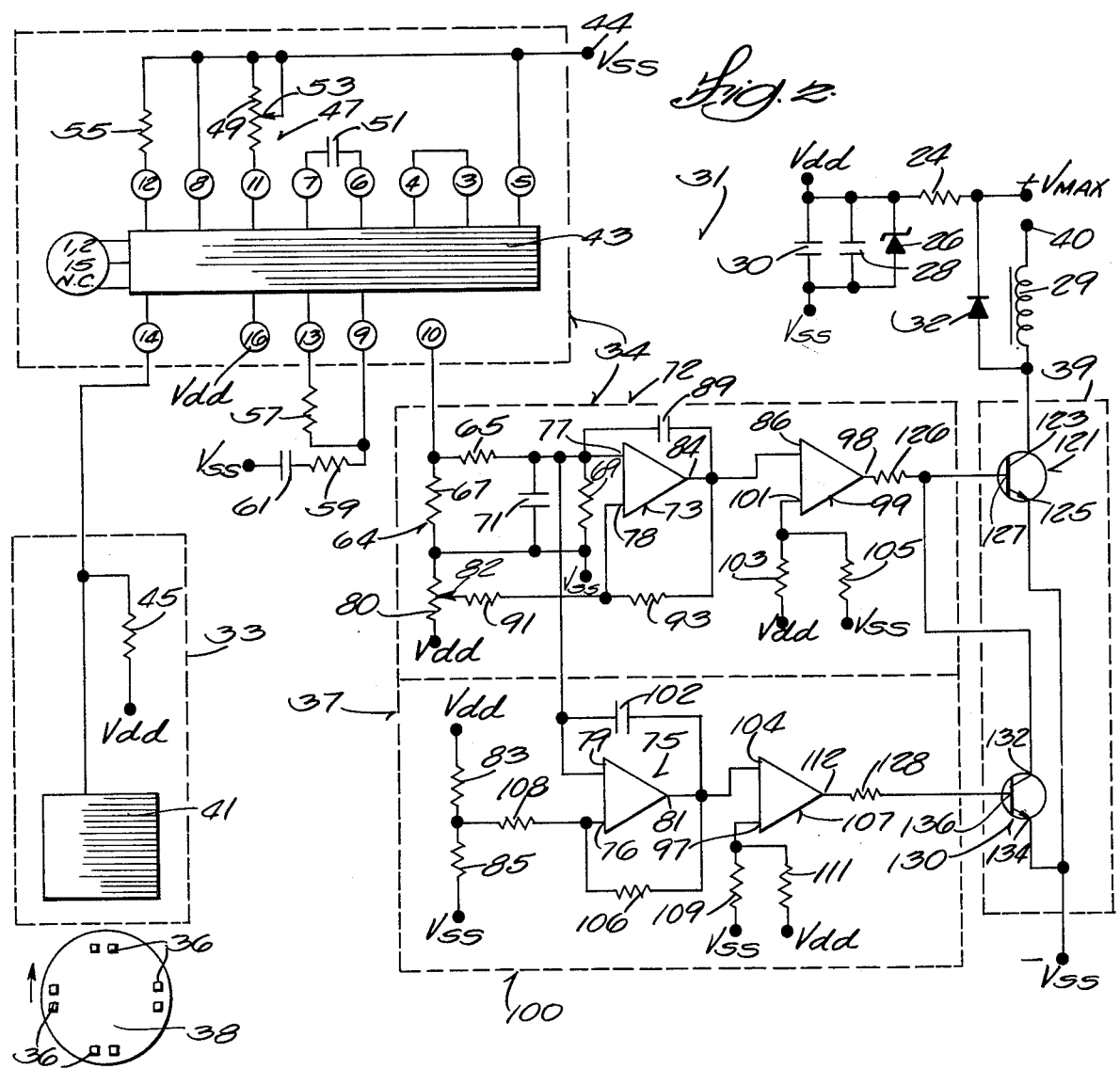
FIG. 2 is a schematic view illustrating components which can be utilized in the controlling arrangement shown in FIG. 1.

FIG. 2 is a schematic drawing including various components which can be utilized in the control circuit 31 shown diagrammatically in FIG. 1. The various components are powered by a source of direct current having a regulated voltage designated Vdd which is provided by a voltage regulator consisting of resistor 24, diode 26, and capacitors 28 and 30, suitably connected to the terminal of the direct current source designated Vmax.

In order to provide the desired digital signal, various motor speed sensor arrangements or devices could be utilized, such as a photoelectric pick-up device, or a magnetic pick-up system. As shown in the illustrated construction, the motor speed sensor 33 preferably comprises a Hall-effect switch 41 connected through resistor 45 to Vdd and which generates an electrical output pulse in response to a magnetic field or magnet passing adjacent the switch. More particularly, one or more magnets 36 are suitably secured to a rotating member such as a brake disc 38 (shown diagrammatically) having a speed of rotation proportional to the vehicle or motor speed. The magnets are utilized to communicate with or switch the Hall-effect switch to provide the desired digital signal having a frequency proportional to motor speed.

The magnets and Hall-effect switch should be suitably located with respect to each other so that the magnets pass close to the switch, e.g., the magnets should pass within 0.040 inches of the switch. A sufficient number of magnets should be placed on the rotating member so that the Hall-effect switch provides a suitable input frequency to the digital to analog conversion means 35 over the range of motor speeds of interest.

While various digital to analog conversion means arrangements could be utilized, such means preferably comprises a phase-locked-loop 43 (PLL) having an input pin 14 which receives the digital signal from the Hall-effect switch 41. The phase-locked-loop 43 is conventional in nature and includes 16 terminals or pins (shown diagrammatically as circles numbered 1 through 16) and consists mainly of a voltage controlled oscillator (VCO) and two different comparator systems (not specifically shown). As should be readily understood by those skilled in the art, the edge controlling comparator of the PLL supplies a correction voltage to the VCO which brings the VCO into step with the input frequency or wave form of the digital signal. Resistors 57 and 59, and capacitor 61 are external to the PLL and are connected to pins 9 and 13 as shown to serve as a low pass filter for the VCO input. Resistor 55 is connected to pin 12 to provide a low frequency offset for the correction voltage. Pin 16 is connected to Vdd, pins 5 and 8 are connected to Vss, pins 3 and 4 are connected to each other, and pins 1, 2 and 15 remain unconnected.

The correction voltage is a DC ramp signal (diagrammatically shown in FIG. 1) having a magnitude proportional to the frequency of the digital signal supplied from the Hall-effect switch, and hence, proportional to motor speed. The magnitude of the DC signal varies between Vss and Vdd as the input frequency of the digital signal increases from zero to a maximum, and is determined by the VCO's own timing circuit 47 which is external to the PLL. The timing circuit 47 consists of a variable resistor 49 connected to pin 11, and a capacitor 51 connected across pins 6 and 7. The variable resistor 49 includes a wiper 53 and is adjustable to change the slope of the DC signal, i.e., to change the magnitude of the voltage of the DC signal which corresponds to a particular motor speed.

The DC signal is available through an internal source follower (not shown) at pin 10 of the PLL and is coupled to the comparator means 37 through a low pass filter, generally designated 64, consisting of resistors 65, 67 and 69, and capacitor 71. The comparator means 37 includes first comparator means, generally designated 72, which functions as a detector for when the motor speed increases to the predetermined field weakening cut-in speed, and also preferably includes second comparator means, generally designated 100, which functions as a detector for when the motor speed reaches an over-speed condition or increases to the predetermined field weakening cut-out speed.

More particularly, the first comparator means 72 includes an operational amplifier 73 which is connected as a comparator and includes an output 84 coupled to buffer means or a second operational amplifier 99. The conventional power supply connections to the operational amplifiers are not shown. The DC signal (which has a magnitude proportional to motor speed) is coupled from the pin 10 of the PLL through low pass filter 64 to the inverting input 77 of the operational amplifier 73. The normal input 78 of the operational amplifier 73 is coupled to or referenced through bias means, preferably comprising a resistor 91 connected to a variable resistor 80, in turn, connected to Vdd. The variable resistor 80 includes a wiper 82 and is adjusted to bias the normal input 78 so that the operational amplifier 73 switches to provide an enabling output when the DC signal rises to a magnitude corresponding to the motor speed having increased to the desired predetermined field weakening cut-in speed.

More particularly, when the field weakening cut-in speed is reached, the output of the operational amplifier 73 switches from Vdd to Vss, and provides an enabling output (Vss) which is received by the buffer means or the inverting input 86 of the second operational amplifier 99. A capacitor 89 is coupled between the inverting input 77 and the output 84 of the operational amplifier 73 to provide negative feed-back for AC signals to prevent the operational amplifier 73 from switching due to ripple on the DC signal. Resistors 91 and 93 coupled in series between the output 84 and the variable resistor 80 provide hysteresis in the switching of the operational amplifier 73 to promote stable motor and vehicle operation.

The normal input 101 of the operational amplifier 99 is biased mid-way between Vdd and Vss by resistors 103 and 105. Thus, when the enabling output or Vss is coupled to the inverting input 86, the output of the operational amplifier 99 rises or generates an output cut-in signal which is coupled through resistor 126 to the electronic switching means 39. When the output cut-in signal is coupled to the electronic switching means 39, the switching means operates, assuming switch 40 is closed, so that the solenoid coil 29 is energized and field weakening of the motor 18 is accomplished.

More particularly, while various electronic switching means arrangements are possible, such means preferably comprises a first transistor 121 having a collector 123 connected to the solenoid coil 29, an emitter 125 connected to Vss, and a base 127 coupled through resistor 126 to the output 98 of the amplifier 99. When the motor speed increases to the field weakening cut-in speed, the output cut-in signal of the amplifier 99 causes current to flow through the base emitter junction so as to turn on transistor 121 thereby connecting the solenoid coil 29 in series between Vmax and Vss (assuming switch 40 is closed). Thus, the solenoid coil 29 is energized to close the solenoid switch 27 and place the field weakening resistor 25 in parallel connection with the field winding 22 to effect the desired field weakening.

Since the frequency of the digital signal and the magnitude of the DC signal are proportional to motor speed, if the motor speed falls below the predetermined field weakening cut-in speed, the magnitude of the DC signal coupled to the inverting input 77 of the operational amplifier 73 is insufficient to cause the output of the operational amplifier 73 to switch from Vdd to Vss. Therefore, the output of the operational amplifier 99 is low and does not turn on transistor 121. Consequently, the field weakening solenoid switch 27 is not activated, notwithstanding closure of the operator switch 40. However, when the motor speed rises to the predetermined field weakening cut-in speed, the output of the operational amplifier 99 rises to provide an output cut-in signal to turn on the transistor 121 to effect field weakening of the motor as described above.

The control circuit 31 operates as described to provide field weakening when the motor speed increases to the predetermined field weakening cut-in speed. It is also desirable to prevent field weakening at an overspeed or high motor speed, i.e., at some predetermined field weakening cut-out speed greater than the predetermined field weakening cut-in speed. To this end, as noted above, the comparator means 37 also includes second comparator means 100.

More particularly, the second comparator means 100 includes an operational amplifier 75 which is connected as a comparator and includes an output 81 coupled to buffer means or operational amplifier 107. The operational amplifier 75 includes an inverting input 79 which is coupled to the DC signal which is fed from the pin 10 through the low pass filter 64. A fixed reference or bias is preferably supplied to the normal input 76 of the operational amplifier 75 by resistors 83 and 85 so that operational amplifier 75 functions as a detector for determining when the motor speed increases to the predetermined field weakening cut-out speed.

In order to calibrate the control circuit 31, the slope of the DC signal of the PLL is adjusted utilizing variable resistor 49 so that the magnitude of the DC signal voltage is such to cause the operational amplifier 75 to switch to provide an enabling output when the motor speed has increased to the overspeed or desired field weakening cut-out speed. After the slope of the DC signal has been adjusted, the variable resistor 80 of the first comparator means 72 is adjusted as already described to provide field weakening when the motor speed increases to the predetermined field weakening cut-in speed.

When the motor speed increases to the field weakening cut-out speed, the output of the operational amplifier 75 switches from Vdd to Vss to provide an enabling output which is coupled to the inverting input 104 of the second operational amplifier 107. Capacitor 102 prevents the operational amplifier 75 from switching due to ripple on the DC signal and resistors 106 and 108 provide hysteresis in the same manner as the previously described capacitor 89 and resistors 91 and 93 associated with the operational amplifier 73.

The normal input 97 of the second operational amplifier 107 is biased by resistors 109 and 111 in the same manner as the second operational amplifier 99 so that when the inverting input 104 is coupled to Vss or the enabling output, the operational amplifier 107 generates an output which rises to provide an output cut-out signal which is coupled to the electronic switching means 39 to de-energize the solenoid coil 29 and prevent field weakening of the motor 18.

More particularly, the electronic switching means 39 includes a second transistor 130 having a collector 132 connected to base 127 of the first transistor 121, and emitter 134 connected to Vss, and a base 136 coupled through resistor 128 to the output 112 of the operational amplifier 107. When the motor speed increases to the field weakening cut-out speed, the output cut-out signal of the amplifier 107 causes current to flow through the base emitter junction of the second transistor 130 to turn on transistor 130, and thereby short out or shunt the base drive of the transistor 121 to turn off transistor 121. When transistor 121 is turned off, the solenoid coil 29 is disconnected from the series connection between Vmax and Vss and de-energized so as to open the solenoid switch 27 and remove the field weakening resistor 25 from the parallel connection with the field winding 22. Thus, when the motor speed increases to the predetermined field weakening cut-out speed, the solenoid coil is de-energized and field weakening is prevented.

When the motor speed falls below the predetermined field weakening cut-out speed, the magnitude of the DC signal coupled to the inverting input 79 of the operational amplifier 75 is insufficient to cause the output of the amplifier 75 to switch from Vdd to Vss. Therefore, the output of the operational amplifier 107 is low and does not turn on transistor 130, and hence, the base drive of transistor 121 is no longer shorted out. Consequently, as described above, so long as the motor speed does not drop below the predetermined field weakening cut-in speed, the transistor 121 will turn on to energize the solenoid coil 29 and effect field weakening of the motor. Thus, assuming the operator switch 40 is closed, the control circuit 31 will provide an output cut-in signal to operate the switching means 39 to effect field weakening of the motor when the motor is operating within a predetermined speed range, i.e., when the motor is operating at a speed ranging from the predetermined field weakening cut-in speed to the predetermined field weakening cut-out speed.

Various of the features of the invention are set forth in the following claims.

What is claimed is:

1. A control for a direct current motor including a field weakening solenoid switch including a solenoid coil, said control including electronic switching means connected in series with the coil for selectively connecting the coil to a source of direct current, speed sensor means adapted for providing an electronic digital signal having a frequency directly proportional to motor speed, and circuit means adapted for receiving said digital signal and for providing an output signal for operating said electronic switching means.

2. A control for a direct current motor including a field weakening solenoid switch including a solenoid coil, said control including electronic switching means connected in series with the coil for selectively connecting the coil to a source of direct current, speed sensor means adapted for providing an electronic digital signal having a frequency proportional to motor speed, digital to analog conversion means coupled to said speed sensor means for receiving said digital signal and for generating a DC signal having a voltage magnitude proportional to the frequency of said digital signal and to motor speed, first comparator means for receiving said DC signal and for generating an output cut-in signal coupled to said electronic switching means for operating said electronic switching means to connect the solenoid coil to the source of direct current to effect field weakening when the speed of the motor increases to a predetermined field weakening cut-in speed, and second comparator means adapted for receiving said DC signal and for generating an output cut-out signal coupled to said electronic switching means for operating said electronic switching means to disconnect the solenoid coil from the source of direct current to prevent field weakening when the speed of the motor increases to a predetermined field weakening cut-out speed greater than said predetermined field weakening cut-in speed.

3. A control in accordance with claim 2 wherein said speed sensor means comprises a Hall-effect switch adapted for generating said digital signal in response to a magnet passing adjacent said Hall-effect switch, the magnet being secured to a rotating member having a speed of rotation proportional to motor speed.

4. A control in accordance with claim 1 wherein said circuit means includes digital to analog conversion means coupled to said speed sensor means for receiving said digital signal and for generating a DC signal having a voltage magnitude proportional to the frequency of said digital signal and to motor speed, and comparator means adapted for receiving said DC signal and for generating an output cut-in signal coupled to said electronic switching means for operating said electronic switching means to connect the solenoid coil to the source of direct current to effect field weakening when the speed of the motor increases to a predetermined field weakening cut-in speed.

5. A control in accordance with claim 4 wherein said comparator means comprises an operational amplifier having a normal input and an inverting input, one of said inputs being coupled to said DC signal, adjustable bias means coupled to the other one of said inputs and adjusted so that said operational amplifier switches to provide an enabling output when said DC signal rises to a magnitude corresponding to the motor speed increasing to said predetermined field weakening cut-in speed, and buffer means adapted for receiving said enabling output and for generating said output cut-in signal which is coupled to said electronic switching means.

6. A control in accordance with claim 2 wherein said digital to analog conversion means comprises a phase-locked-loop having an input coupled to said speed sensor means for receiving said digital signal, and being adapted for generating said DC signal which is coupled to said comparator means.

7. A control in accordance with claim 2 wherein said first comparator means comprises an operational amplifier having a normal input and an inverting input, one of said inputs being coupled to said DC signal, bias means coupled to the other one of said inputs and adjusted so that said operational amplifier switches to provide an enabling output when said DC signal rises to a magnitude corresponding to the motor speed increasing to said predetermined field weakening cut-in speed, and buffer means adapted for receiving said enabling output and for generating said output cut-in signal which is coupled to said electronic switching means.

8. A control in accordance with claim 7 wherein said electronic switching means comprises a transistor having a collector-emitter path connected in series with the solenoid coil and with the source of direct current, said transistor also including a base, and wherein said buffer means is adapted for coupling said output cut-in signal to said base to turn on said transistor to connect the solenoid coil to the source of direct current to effect field weakening when the motor speed increases to said predetermined field weakening cut-in speed.

9. A control in accordance with claim 2 wherein said digital to analog conversion means comprises a phase-locked-loop having an input coupled to said speed sensor means for receiving said digital signal, and being adapted for generating said DC signal which is coupled to said first comparator means and to said second comparator means.

10. A control in accordance with claim 9 wherein said electronic switching means comprises a first transistor having a collector-emitter path connected in series with the solenoid coil and with the source of direct current, said first transistor also including a first base, and a second transistor having a collector-emitter path coupled to said first base of said first transistor, said second transistor also including a second base, wherein said first comparator means comprises a first operational amplifier having a normal input and an inverting input, one of said inputs being coupled to said DC signal, first bias means coupled to the other one of said inputs and adjusted so that said first operational amplifier switches to provide a first enabling output when said DC signal rises to a magnitude corresponding to the motor speed increasing to said predetermined field weakening cut-in speed, and first buffer means adapted for receiving said first enabling output and for generating said output cut-in signal which is coupled to said first base to turn on said first transistor to effect field weakening in response to the motor speed increasing to said predetermined field weakening cut-in speed, and wherein said second comparator means comprises a second operational amplifier having a normal input and an inverting input, one of said inputs being coupled to said DC signal, second bias means coupled to the other one of said inputs so that said second operational amplifier switches to provide a second enabling output when said DC signal rises to a magnitude corresponding to the motor speed increasing to said predetermined field weakening cut-out speed, and second buffer means adapted for receiving said second enabling output and for generating said output cut-out signal which is coupled to said second base to turn on said second transistor to thereby turn off said first transistor to disconnect the solenoid coil from the source of direct current to prevent field weakening when the motor speed increases to said predetermined field weakening cut-out speed.

11. A control for a direct current motor including a field weakening solenoid switch including a solenoid coil, said control including electronic switching means connected in series with the solenoid coil for selectively connecting the coil to a source of direct current, speed sensor means including a Hall-effect switch adapted for generating an electronic digital signal having a frequency proportional to motor speed in response to a magnet passing adjacent said Hall-effect switch, the magnet being secured to a rotating member having a speed of rotation proportional to motor speed, a phase-locked-loop having an input coupled to said Hall-effect switch for receiving said digital signal, and being adapted for generating a DC signal having a magnitude proportional to the frequency of said digital signal and the motor speed, first comparator means adapted for receiving said DC signal and for generating an output cut-in signal coupled to said electronic switching means for operating said electronic switching means to connect the solenoid coil to the source of direct current to effect field weakening when the speed of the motor increases to a predetermined field weakening cut-in speed and second comparator means adapted for receiving said DC signal and for generating an output cut-out signal coupled to said electronic switching means for operating said electronic switching means to disconnect the solenoid coil from the source of direct current to prevent field weakening when the speed of the motor increases to a predetermined field weakening cut-out speed greater than said predetermined field weakening cut-in speed.

12. A control in accordance with claim 11 wherein said first comparator means comprises an operational amplifier having a normal input and an inverting input, one of said inputs being coupled to said DC signal, bias means coupled to the other one of said inputs and adjusted so that said operational amplifier switches to provide an enabling output when said DC signal rises to a magnitude corresponding to the motor speed increasing to said predetermined field weakening cut-in speed, and buffer means adapted for receiving said enabling output and for generating said output cut-in signal which is coupled to said electronic switching means.

13. A control in accordance with claim 12 wherein said electronic switching means comprises a transistor having a collector-emitter path connected in series with the solenoid coil and with the source of direct current, said transistor also including a base, and wherein said buffer means is adapted for coupling said output cut-in signal to said base to turn on said transistor to connect the solenoid coil to the source of direct current to effect field weakening when the motor speed increases to said predetermined field weakening cut-in speed.

14. A control in accordance with claim 11 wherein said electronic switching means comprises a first transistor having a collector-emitter path connected in series with the solenoid coil and with the source of direct current, said first transistor also including a first base, and a second transistor having a collector-emitter path coupled to said first base of said first transistor, said second transistor also including a second base, wherein said first comparator means comprises a first operational amplifier having a normal input and an inverting input, one of said inputs being coupled to said DC signal, first bias means coupled to the other one of said inputs and adjusted so that said first operational amplifier switches to provide a first enabling output when said DC signal rises to a magnitude corresponding to the motor speed increasing to said predetermined field weakening cut-in speed, and first buffer means adapted for receiving said first enabling output and for generating said output cut-in signal which is coupled to said first base to turn on said first transistor to effect field weakening in response to the motor speed increasing to said predetermined field weakening cut-in speed, and wherein said second comparator means comprises a second operational amplifier having a normal input and an inverting input, one of said inputs being coupled to said DC signal, second bias means coupled to the other one of said inputs so that said second operational amplifier switches to provide a second enabling output when said DC signal rises to a magnitude corresponding to the motor speed increasing to said predetermined field weakening cut-out speed, and second buffer means adapted for receiving said second enabling output and for generating said output cut-out signal which is coupled to said second base to turn on said second transistor to thereby turn off said first transistor to disconnect the solenoid coil from the source of direct current to prevent field weakening when the motor speed increases to said predetermined field weakening cut-out speed.

* * * * *